United States Patent [19]

Hummel

[11] 3,925,052

[45] Dec. 9, 1975

[54] METHOD OF IMPROVING QUALITY OF FLAT GLASS FORMED ON MOLTEN TIN

[75] Inventor: Merritt J. Hummel, Lower Burrell, Pa.

[73] Assignee: PPG Industries, Inc., Pittsburgh, Pa.

[22] Filed: Oct. 15, 1974

[21] Appl. No.: 514,981

[52] U.S. Cl. .............. 65/65 A; 65/99 A; 65/182 R; 106/DIG. 8
[51] Int. Cl.² ........................................ C03B 18/02
[58] Field of Search ............ 65/65 A, 99 A, 182 R; 106/DIG. 8

[56] References Cited
UNITED STATES PATENTS
3,251,667  5/1966  Touvay .......................... 65/99 A X Primary Examiner—Arthur D. Kellogg
Attorney, Agent, or Firm—Dennis G. Millman; William J. Uhl

[57] ABSTRACT

A method for minimizing both top and bottom surface distortion in flat soda-lime-silica glass which has been formed on a bath of molten tin and in which stannous tin has penetrated into the bottom or tin-contacting surface is disclosed. The method involves incorporating into the glass an oxidizing agent which is capable of oxidizing stannous tin to stannic tin in a molten glass environment.

14 Claims, 4 Drawing Figures

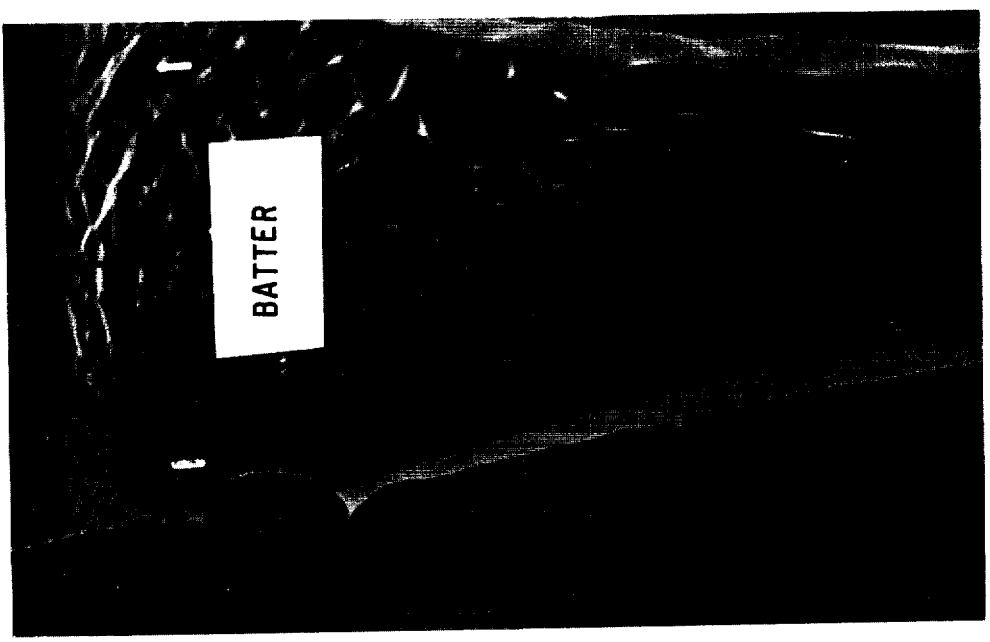
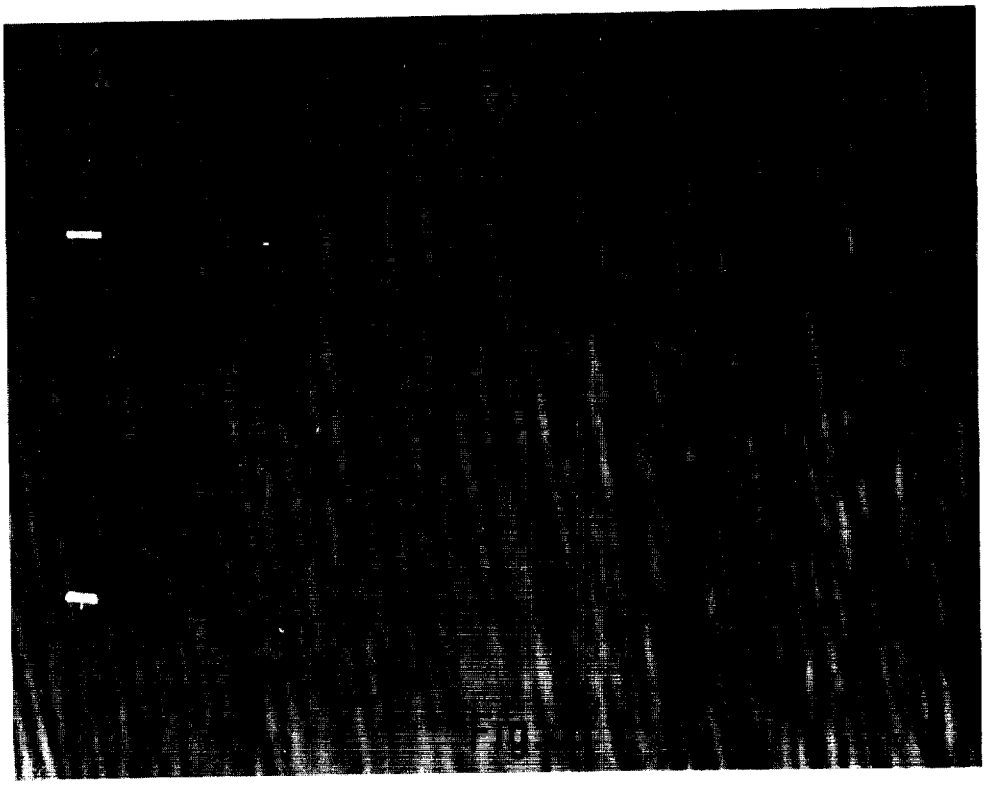

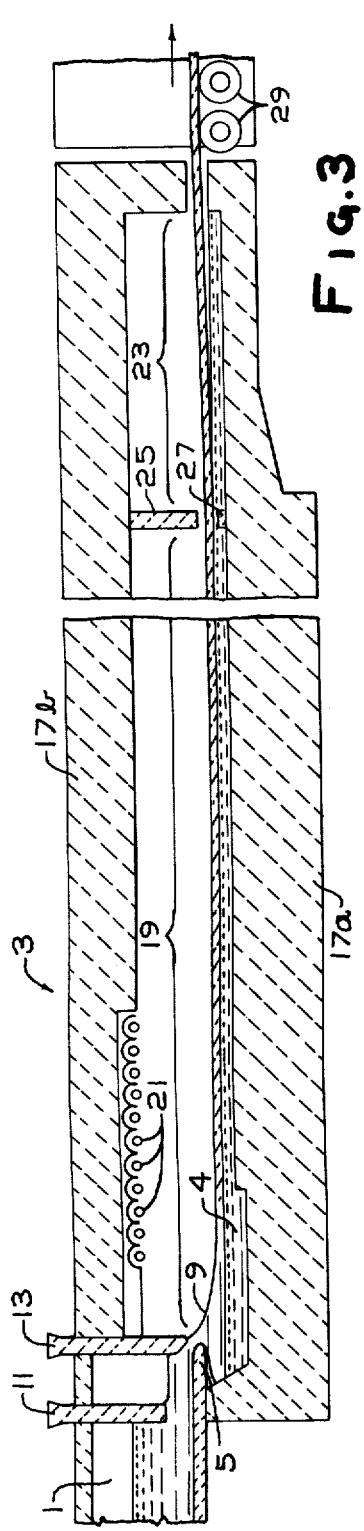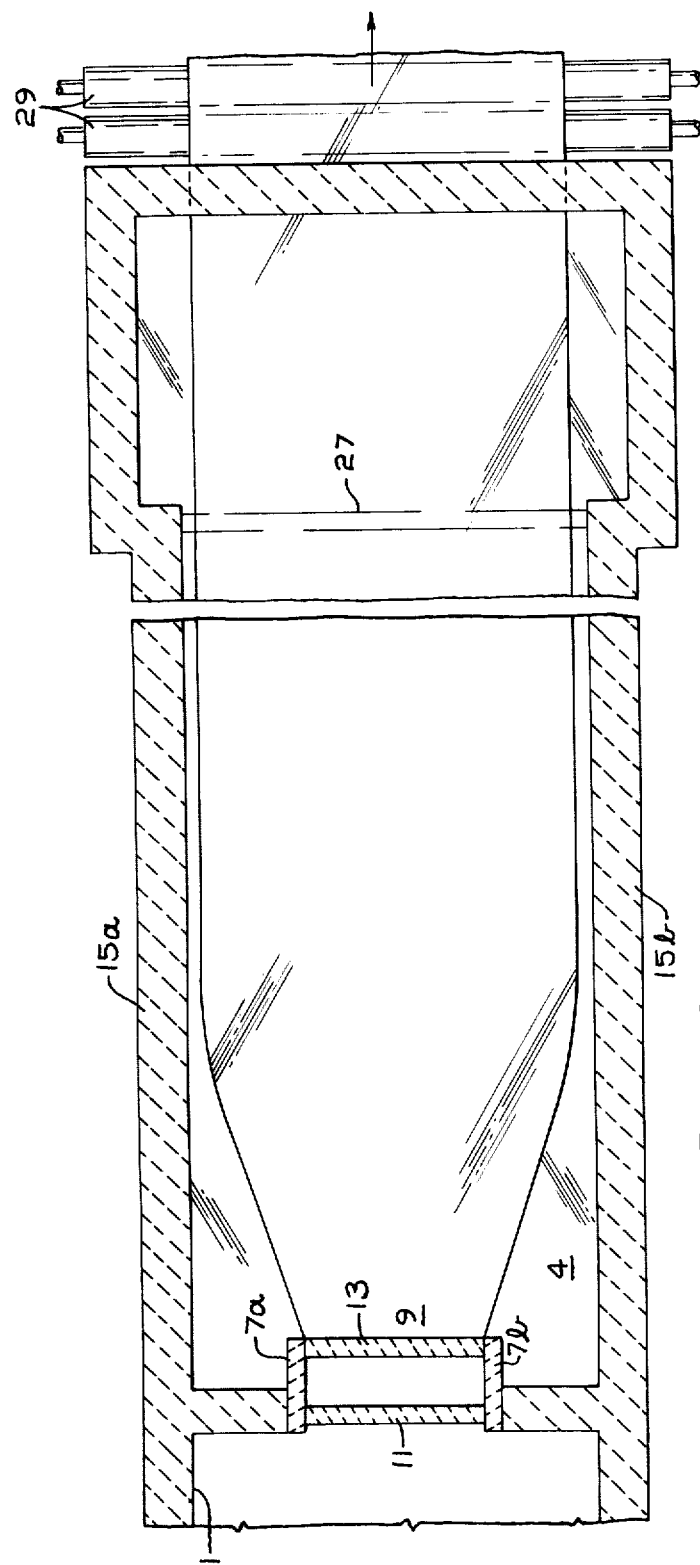

METHOD OF IMPROVING QUALITY OF FLAT GLASS FORMED ON MOLTEN TIN

BACKGROUND OF THE INVENTION

1. Field of the Invention

This invention relates to a method of forming flat glass with improved surface properties. More particularly, this invention relates to a method for float forming flat glass substantially free of top surface distortion normally associated with flat glass produceed by float forming on a bath of molten tin.

2. Brief Description of the Prior Art

Manufacturing of flat glass by forming on a bath of molten tin has been known since the 1900's and has been described in U.S. Pat. Nos. 710,357 to Heal, 789,911 to Hitchcock, and in U.S. Pats. Nos. 2,991,159, 3,083,551 and 3,220,186, all to Pilkington. Briefly, the process involves delivering a molten glass to a pool of molten tin confined within a forming chamber. Shortly after initial delivery, the applied tractive forces in withdrawing the glass from the forming chamber attenuate the glass while it is cooling to form a continuous sheet or ribbon of glass of a desired, predetermined, final shape and thickness which is continuously advanced over the bath of molten tin.

To successfully form flat glass, the forming chamber should be maintained as free as possible from oxygen, because as the oxygen content of the tin rises, the glass absorbs increasing amounts of stannous tin particularly at the beginning of the forming chamber where the molten glass is discharged onto the molten tin. Subsequent heat treatment such as is used in thermal tempering brings about oxidation of the stannous tin to stannic tin resulting in bottom or tin-contacting surface distortion in the glass. This distortion is a microscopic wrinkling of the surface which scatters transmitted light and is familiarly referred to in the art as bloom. See FIG. 2 which is a photomicrograph of a bloomed float glass surface.

Besides bloom which is on the bottom surface, another optical distortion associated with float glass is top surface distortion familiarly referred to as batter and broken line distortion. This distortion is much grosser than bottom surface bloom and is evidenced, not so much by reduction in transmitted light, but is detected when the glass is observed at a small angle by reflected light. Top surface distortion known as batter is shown in the photograph in FIG. 1. Top surface batter seems to develop in the glass early in the float forming operation in the hotter region of the float forming chamber when the glass is being attenuated into sheet form before it has attained its final shape and thickness.

Until the discoveries of the present invention, the prior workers in the art of glassmaking have not believed that the problems of bottom and top surface distortion were interrelated. The prior art believed that the problems had different origins and had to be dealt with separately. For example, since the region of bottom surface bloom is stannous tin penetration of the bottom surface of the ribbon, the prior art has recommended various procedures to reduce the oxygen content of the tin bath since it is oxygen which oxidizes the tin metal to stannous tin. Thus, it has been proposed to tightly seal the float chamber and to conduct the float forming operation under a reducing atmosphere, for example, 95 percent nitrogen and 5 percent hydrogen gases.

With top surface distortion, the prior art quite reasonably believed the origin of the problem resided in the top surface of the ribbon. Certain float glass manufacturers in the prior art believed that top surface distortion was due to volatilization of one or more of the volatile constituents of the glass composition from the surface of the glass. This volatilization, which created compositional differences between the ribbon surface and the interior portions of the ribbon, resulted in surface distortion due to different coefficients of thermal expansion between the ribbon surface and interior as the glass is attenuated and cooled advancing through the tin bath. To control the problem, certain float glass manufacturers recommended altering basic float glass compositions so as to reduce their volatility.

SUMMARY OF THE INVENTION

Applicant believes that top surface distortion in float glass is due to a great extent on the cause of bottom surface bloom, that is, on the penetration of stannous tin into the bottom surface of the glass. The glass itself contains various oxides and dissolved oxygen which are believed to oxidize some of the absorbed stannous tin to stannic tin as the ribbon advances along the float bath. This internal oxidation is believed to occur as the glass is being attenuated and cooled. Applicant believes that this oxidation which occurs on the bottom surface stresses not only the bottom surface but also the top surface creating top surface distortion.

Surprisingly, applicant has found that if an oxidizing agent selected from a specific class is incorporated into the glass, both bottom surface bloom and top surface distortion, such as batter, are essentially eliminated.

Therefore, in accordance with the present invention, an improved method for forming flat glass by forming on a pool of molten tin is provided. The forming process comprises the steps of fusing a glass batch to form molten glass, followed by delivering the molten glass to a pool of molten tin in a forming chamber. The molten glass is attenuated along the surface of the tin while cooling to form a continuous sheet of flat glass having a desired, predetermined, final shape and thickness. The sheet of flat glass is advanced along the pool of molten tin and eventually out of the forming chamber. After the molten glass has been delivered to the molten tin, stannous tin penetrates the bottom or tin-contacting surface of the glass, while the glass is relatively fluid before it has attained its final shape and thickness. This penetrated stannous tin is capable of causing top surface distortion in the glass. The improvement of the invention comprises interfusing with the glass batch an oxidizing agent which is capable of oxidizing stannous tin to stannic tin in an environment of molten glass. The oxidizing agent is present in the glass in an amount sufficient to maintain the glass substantially free of top surface distortion, but is present in an amount insufficient to impart heat-absorbing characteristics to the glass.

BRIEF DESCRIPTION OF THE DRAWINGS

FIG. 2 is a photomicrograph 500X, showing distortion in float glass which occurs on the bottom or tin-contacting surface of the glass and which is known as bloom;

FIG. 1 is a photograph of projected image (shadowgraph) resulting from projecting a point-light source through a ⅛ inch thick glass sample free of bottom surface bloom and having top surface batter;

FIG. 3 is a longitudinal sectional view of a float forming chamber; and

FIG. 4 is a sectional plan view along line IV—IV of FIG. 3.

DETAILED DESCRIPTION

The oxidizing agent which is incorporated into the glass is a metal oxide which is capable of oxidizing stannous tin to stannic tin in an environment of molten glass. By the term "molten glass environment" is meant molten glass of a composition commercially used in float glass production. These glasses are basically soda-lime-silica glasses and have approximately the following composition:

| Ingredient | Percent by Weight on an Oxide Basis |
|---|---|
| $SiO_2$ | 65 – 75 |
| $Na_2O$ | 10 – 15 |
| $K_2O$ | 0 – 2 |
| $Al_2O_3$ | 0 – 2 |
| CaO | 5 – 10 |
| MgO | 2 – 5 |
| $SO_3$ | 0 – 0.5 |
| $Fe_2O_3$ | 0 – 0.15 |

Such glasses are melted under conventional melting conditions as will be described in more detail later, and discharged in a molten condition to a pool of molten tin in a forming chamber which is maintained in a reducing atmosphere, for example, 95 percent nitrogen and 5 percent hydrogen. The glass upon initial discharge onto the molten tin will usually be at a viscosity of about $10^{3.5}$ poises depending somewhat on composition and how the glass is delivered to the molten tin, that is, by delivering the glass as a molten layer in a substantially horizontal manner as described in U.S. pat. application Ser. No. 338,497, filed Mar. 6, 1973, to Edge et al., or delivering the glass to the molten tin and permitting it to freely spread over the surface of the molten tin such as described in U.S. Pat. No. 3,083,551 to Pilkington.

Suitable oxidizing agents are those which are capable of forming in molten glass higher oxides of chromium, manganese, cerium, arsenic, antimony and iron. Examples of such higher oxides include $CrO_3$, $MnO_2$, $CeO_2$, $As_2O_5$, $Sb_2O_5$, $V_2O_5$ and $Fe_2O_3$. Although these oxides are shown in stoichiometric ratios, it should be appreciated that in molten glass the oxides may have non-stoichiometric formula. Also, the oxides are given in what is believed to be their highest oxidation state, although it is quite possible that higher oxidation states may exist in a molten glass environment. For example, $Mn_2O_7$ is thought to exist in molten glass. It is known from experimental and theoretical calculations that the above oxides are capable of oxidizing stannous tin to stannic tin in molten glass. See, for example, Kühl, C., Rudow, H. and Weyl, W., Oxydations-und Reduktionsgleichgewichte in Farbglasern, Sprechsaal, 71, 118 (1938); Tress, H. J., "A Thermodynamic Approach to Redox Equilibria in Glasses", Physics and Chemistry of Glasses, Vol. 1, No. 6, December 1960; and Johnston, W. D., "Oxidation-Reduction Equilibria in Molten $Na_2O \cdot 2SiO_2$ Glass", J. Am. Ceram. Soc., 48, April 1965, 184–190. Among the oxidizing agents mentioned above, cerium oxide is preferred because it imparts substantially no color to the glass, whereas other oxidizing agents such as antimony and chromium oxides impart color to the glass. However, even though coloring the glass, these oxidizing agents still perform the function of the invention, that is, enabling the forming of flat glass substantially free of top surface distortion and also minimizing bloom formation during subsequent thermal treatment such as thermal tempering and bending.

Besides the above-mentioned oxides, other oxides should be suitable in the practice of the invention. An indication of suitability of a particular oxide can be obtained from its Gibbs Free Energy ($\Delta G$) for the following reaction at standard conditions of temperature and pressure:

lower oxide + 1 mole $O_2$ → higher oxide (1)

The Gibbs Free Energy in molten glass cannot readily be determined because of the lack of information available for the above reaction in glasses. However, the Gibbs Free Energy at standard conditions of temperature and pressure ($\Delta G°$) of various oxides can readily be obtained and is available from standard thermodynamic tables. See, for example, United States Bureau of Mines Bulletin No. 605, "Thermodynamic Properties of 65 Elements", C. E. Wicks and F. E. Block, United States Government Printing Office (1963). The Gibbs Free Energy of various redox oxides, although obviously being different in molten glass than at standard conditions of temperature and pressure, still should have the same order of value. Thus, if a first redox oxide has a more positive $\Delta G°$ value for reaction (1) than a second redox oxide, then the first redox oxide should have a more positive $\Delta G$ in molten glass than the second redox oxide. This has been substantiated experimentally with the above-disclosed oxides. From the above-mentioned thermodynamic tables, $\Delta G°$ for the conversion of stannous oxide to stannic oxide $2SnO + O_2 \rightarrow 2SnO_2$ (2)

is −125.4 kilocalories/mole $O_2$. Therefore, for an oxidizing agent to oxidize stannous oxide to stannic oxide, the $\Delta G°$ for the oxidizing agent in the reaction lower oxide + $O_2$ → higher oxide (1)

should have a substantially (i.e., about 10 percent) more positive value than −125.5 kilocalories/mole of oxygen so that the combined reaction will have a negative $\Delta G°$. For example, $\Delta G°$ for the reaction $Sb_2O_3 + O_2 \rightarrow Sb_2O_5$ is −52.5 kilocalories/mole of oxygen. Thus, based on the Gibbs Free Energy, $Sb_2O_5$ should oxidize stannous oxide to stannic oxide in molten glass, that is,

| | $\Delta G^0$ (kilocalories/mole $O_2$) |
|---|---|
| $2SnO + O_2 \rightarrow 2SnO_2$ | −125.5 |
| $Sb_2O_5 \rightarrow Sb_2O_3 + O_2$ | −52.5 |
| $2SnO + Sb_2O_5 \rightarrow 2SnO_2 + Sb_2O_3$ | −73.0 |

The oxidizing agent can be incorporated into the glass in the form of an elemental oxide or as a salt of an element which on melting of the glass is converted to the oxide capable of oxidizing stannous tin. The salts can be nitrates or sulfates.

The amount of oxidizing agent incorporated into the glass should be sufficient to maintain, during the forming operation, the glass substantially free of top surface distortion and yet not impart heat-absorbing characteristics to the glass. By the term "substantially free of top surface distortion" is meant that the glass has less top surface distortion than a glass of comparable composition, but without the presence of the oxidizing agent and which has been melted and formed under identical conditions to those experienced by the glass containing the oxidizing agent.

By the expression "insufficient to impart heat-absorbing characteristics to the glass" is meant that the oxidizing agent is present in the glass either by itself or in combination with other ingredients (e.g., oxides of cobalt and selenium) in an amount insufficient to make the glass heat absorbing as determined according to federal specification DD-G-451A. In order for glass to qualify as heat absorbing under this specification, it must have a total solar energy transmittance of less than 50 percent at ⅛ inch thickness.

Top surface distortion such as top surface batter is observed at a small angle, i.e., about 10° from the horizontal, by reflected light. Top surface batter in float glass may be qualitatively evaluated by observing a shadow projection of the glass using a point-light source aimed perpendicularly at a target screen and positioning the glass at an angle with respect to the target screen so that an image of the glass is projected on the screen. The optical distortion may also be observed in Schlieren photographs of the glass. The optical distortion pattern is regular, repetitive and anisotropic in glass produced by methods like that of Pilkington in U.S. Pat. No. 3,083,551 wherein the glass falls onto the molten metal and spreads outwardly and then is drawn inwardly again. In glass produced in the manner of Hitchcock in U.S. Pat. No. 789,911 or Edge et al. in U.S. patent application Ser. No. 338,497, filed Mar. 6, 1973, involving horizontal delivery onto the molten metal while maintaining the width of the glass substantially unchanged, the distortion pattern is regular, repetitive and substantially isotropic. In both types of glass, distortion may be sufficiently intense (that is, the variation of lightness to darkness and the projected shadow is great) to be easily observed by even an untrained eye when the glass is coated with a reflective coating and observed by reflected light.

Top surface batter in glass formed on a bath of molten tin is caused by variations in the surface of the glass. The surfaces are not perfectly flat but rather are characterized by a plurality of elevations and depressions which bend or distort a beam of light passing through the glass. Top surface batter can be detected during production using a device such as disclosed and claimed by Simko in U.S. Pat. No. 3,799,679 or in a manner described in U.S. Pat. No. 3,792,930 to Obenreder.

Optical distortion measurements, as described above, are made off-line on glass samples cut from the continuously formed float glass sheet. Normally the distortion measurements are made on a 22-inch scan length. Top surface distortion can be determined separately from bottom surface distortion and distortion in the bulk between the surfaces of the glass. Distortion measurements as determined by the above methods are reported as distortion sums and distortion peaks which are dimensionless values. However, a correlation between distortion sums and distortion peaks and diopter exists with each distortion sum unit being equivalent to 0.05 diopter-inch based on a standard 22-inch scan length. The distortion peak units are each equivalent to 0.002 diopter.

Flat glass samples prepared in accordance with the present invention have distortion sums within the range of 1.0 to 1.5 diopter-inch based on a standard 22-inch scan length and distortion peaks within the range of 0.02 to 0.05 diopter over a thickness range of 0.090 to 0.5 inch.

Another method of detecting top surface batter in float glass is by the zebra board angle. The zebra board angle is the angle a specimen of glass may be placed with respect to a planar surface having thereon a series of straight lines and positioned perpendicular to a viewer's line of sight when the lines become distorted (bent) as viewed through the glass. The glass is midway between the planar surface and the viewer. If the glass were a perfect optical flat, it could be turned to 90° without causing distortion. The test is simple and expedient, although less precise and more subjective than the distortion analysis mentioned earlier. Larger zebra board angles indicate less intense top surface batter. Flat glass float formed in accordance with the invention has zebra board angles about 58° to 65° for glass having a thickness of 0.090 to 0.5 inch.

The amount of oxidizing agent sufficient to maintain the top surface of the glass substantially free of distortion and yet not impart heat-absorbing properties to the glass depends on the final glass composition, melting and forming conditions and also on the oxidizing agent itself since, as has been mentioned above, different oxidizing agents have different potentials for oxidizing stannous tin to stannic tin, and certain oxidizing agents such as iron oxide will impart heat-absorbing properties to the glass while other oxidizing agents such as cerium oxide will not impart heat-absorbing properties to the glass. In general, it is believed that the oxidizing agent should be present broadly within the range of about 0.01 to 5 percent by weight based on total weight of the glass composition. With iron oxide, its concentration measured as $Fe_2O_3$ should be maintained below 0.5 percent by weight which is known to impart heat-absorbing characteristics to the glass.

The method in which oxidizing agent is interfused into the glass is preferably to add it to the glass batch-making materials prior to melting, although it can be added to the melt at any time during the melting and refining operation as long as good homogenization of the oxidizing agent throughout the glass is attained. Adding the oxidizing agent to the batch ingredients is preferred because it insures uniform distribution of the oxidizing agent throughout the glass.

For a typical soda-lime-silica glass, the batch-making materials used in the practice of the invention are those which are conventionally known in the flat glass art. The materials include sand, soda ash (sodium carbonate), caustic soda (sodium hydroxide), limestone (calcium carbonate), dolomite (calcium carbonate and magnesium carbonate), aluminum hydrate, feldspar (sodium potassium aluminum silicate), aplite (fine-grained white-colored granite consisting almost entirely of quartz and feldspar), nepheline syenite (mixture of several different sodium aluminum silicates and potassium aluminum silicates), rouge (iron oxide present in an amount insufficient to minimize top surface batter as envisioned by the present invention), salt cake (sodium sulfate), carbon and cullet (crushed glass). The soda-lime-silica glass batch-making materials and oxidizing agent when properly proportioned, mixed and melted should give a glass having the following composition:

| Component | Percent by Weight on the Oxide Basis |
|---|---|
| $SiO_2$ | 65 – 75 |

| Component | -continued<br>Percent by Weight on the Oxide Basis |
|---|---|
| $Na_2O$ | 10 – 15 |
| $K_2O$ | 0 – 2 |
| $Al_2O_3$ | 0 – 2 |
| CaO | 5 – 10 |
| MgO | 2 – 5 |
| $SO_3$ | 0 – 0.5 |
| $Fe_2O_3$ | 0 – 0.15 |

Besides soda-lime-silica glass, the invention should also be applicable to other glasses such as borosilicate glass and alumino silicate glass. Batch ingredients for these other glasses are well known in the art and information regarding them can be obtained from Glass Engineering Handbook, E. B. Shand, 2nd Edition (1958), McGraw-Hill Book Co., Inc., New York.

The glass batch-making ingredients which preferably include the oxidizing agent should be well mixed with one another and fed on a continuous basis to a furnace for melting and refining as is well known in the art. The batch ingredients can be fed to the furnace as loose batch or alternately they can be first pelletized using caustic soda as a binding agent and as a total or partial replacement for the soda ash. Usually measured quantities of well-mixed glassmaking ingredients are fed by a batch feeder into a fill doghouse of a glassmaking furnace. A typical furnace for the manufacture of float glass is a relatively long structure comprising a bottom and a roof; a back wall to which is connected a fill doghouse; a front wall through which there is an opening leading to the float forming chamber. Side walls join the front and back walls and having firing ports extending into a melting section of the furnace and skim kilns or skim doghouses to remove floating dross extending into the melting section closest to the back wall and in the refiner section closest to the front wall. Commonly, a drop arch extending downwardly from the roof separates the melting section from the refining section.

Batch ingredients are continuously or intermittently fed into the fill doghouse and, being lighter than molten glass, float upon the molten glass within the furnace. Heat is applied to these batch ingredients, generally by burning hydrocarbon fuel in the head space of the melting section above the unmelted batch and molten glass. This causes the batch ingredients to react and melt joining into the molten glass upon which they are floating. Molten glass flows from the melting region into and through the refining section and then is discharged through the opening in the front wall leading to the float forming chamber.

In the refiner, the glass is allowed to cool gradually and to remove undissolved gases and volatile impurities. Natural cooling occurs due to radiation of the heat from the upper exposed surface of the molten glass to the roof of the refiner and to the upper portion of the walls of the refiner. Heat is conducted from the molten glass through the lower portion of base and wall portion of the side walls through the bottom and through the front wall below the discharge opening. Forced heat removal may be accomplished by blowing air into the head space above the molten glass, by inserting coolers into the molten glass or by inserting radiation sink coolers into the head space above the molten glass.

In glassmaking furnaces for melting and conditioning glass to prepare glass for forming by a float forming method, the refiner width is about 3 to 10 times the width of the discharge opening of the front wall through which the molten glass flows to the float forming chamber. Connected to the furnace at this discharge opening is a passage or canal leading from the furnace to the float forming chamber. Molten glass flows into the canal and over a lip at the downstream end of the canal. From there, the molten glass flows forwardly onto a pool of molten tin and spreads outwardly and rearwardly as well as in a forward manner on the molten tin. The float forming operation can best be appreciated from a consideration of FIGS. 3 and 4.

The drawings show the downstream end of the canal 1 leading into the float forming chamber 3 containing molten metal 4. The canal has a floor or lip 5 with which side jambs 7a and 7b form a spout of generally rectangular cross-section at the end of the canal. The molten metal 4 is tin or a tin alloy and has a greater density than the glass 9 discharged thereon and is substantially immiscible with the glass. A glass flow regulating tweel 11 and a gate 13 are each adjustably suspended in a conventional manner and cooperate with the spout to control the flow of glass from the canal to the molten tin 4. Glass discharging from the spout freely spreads over the surface of the molten tin to form a fluid pool of glass. The applied tractive forces in withdrawing the glass from the chamber attenuate the glass in thickness and width while it is cooling to form a continuous sheet or ribbon.

The above-described method of delivery of the molten glass to the bath of molten tin is the method generally described in Pilkington U.S. Pat. No. 3,083,551. However, it should be appreciated that other methods of delivery can be used. For example, the molten glass can be delivered to the pool of molten tin as a layer of molten glass in the manner generally described in the aforementioned U.S. patent application Ser. No. 338,497 to Edge et al. and U.S. Pat. No. 2,991,159 to Pilkington. In the Edge el al method, the layer of molten glass is delivered to the pool of molten tin in a substantially horizontal manner from a region of molten glass which is at substantially the same elevation as that of the molten tin. In the method of U.S. Pat. No. 2,991,159, the molten glass is delivered downwardly from a region of molten glass which is at a higher elevation than the molten tin. In these latter methods of delivery, the glass is attenuated substantially only in thickness as width remains relatively constant throughout the float forming operation.

The molten tin 4 is confined within the forming chamber 3 by refractory side walls 15a and 15b and a bottom and top wall 17a and 17b, respectively, all constructed of a suitable refractory material which is essentially non-reactive with the tin.

To minimize oxidation of the molten tin, a reducing atmosphere is imposed over the ribbon. A suitable reducing atmosphere is a mixture of 95 percent nitrogen and 5 percent hydrogen gases.

As shown in the drawings, the bath of molten metal is divided into two zones which are maintained at different temperatures. The first zone is called the forming and surfacing zone 19 and begins at the discharge end of the glass melting furnace where the molten glass is discharged from the canal onto the molten tin. The forming and surfacing zone extends for about the first two-thirds of the length of the bath, which is conventionally about 160 feet in overall length. While in the forming and surfacing zone, the glass is maintained at a relatively high temperature so that it will be fluid enough for the forces of surface tension, gravity and applied tractive forces in withdrawing the glass from the discharge end of the bath to attenuate the glass while cooling to form a continuous sheet or ribbon. The glass itself will contain appreciable sensible heat but additional radiant heaters 21 are positioned in the roof of the float bath above the glass as it is initially discharged onto the molten bath to give better control in forming. The temperature of a conventional soda-lime-silica glass as it is discharged onto the tin bath will be about 2050°F. and the temperature will decrease over the length of the forming and surfacing zone to about 1200°F. at the end of the forming and surfacing zone. The viscosity of the glass as it is discharged onto the molten tin is about $10^{3.5}$ poises and the viscosity increases as the temperature decreases so that the viscosity of the glass at the end of the forming and surfacing zone is about $10^{9.4}$ poises.

After the glass passes through the forming and surfacing zone, it passes to a cooling zone 23 which is physically separated from the forming and surfacing zone by a drop arch 25 and a graphite dam 27 to maintain a temperature differential between the two zones. In the cooling zone, the glass sheet is cooled down until the surfaces are hard enough for the sheet to be taken out of the bath without the discharge rollers 29 marking the bottom surface.

A continuous sheet of glass is produced with uniform thickness and a bright fire-polished surface.

During the time the glass through the forming and surfacing zone, the molten glass is attenuated into ribbon form due to the forces of surface tension, gravity and the tractive pulling force from the end of the bath. It is during this period of attenuation that top surface batter is most apt to develop. It is also during this period that most of the tin in the form of stannous tin most readily penetrates into the bottom surface of the glass. Although not intending to be limited to any theory, the reason the oxidizing agent is believed to substantially minimize top surface distortion is because the oxidizing agent oxidizes the stannous tin which penetrates the bottom surface of the glass to stannic tin while the glass is still hot and can relieve any stresses imposed on the glass surface by viscoelastic flow. If, on the other hand, the glass does not contain a sufficient amount of a capable oxidizing agent, the stannous tin will not be quickly oxidized in the hotter portions of the forming and surfacing zone but will be more slowly oxidized as the glass passes into the cooler regions of the forming and surfacing zone where the glass increases in viscosity, becomes more rigid and is less able to relieve the stresses imposed on the surface of the glass by viscoelastic flow. As a result, the bottom surface of the glass distorts somewhat to relieve the stress that is developing due to the volume change associated with the conversion of stannous tin to stannic tin. Surprisingly, the top surface of the glass also distorts in response to the stresses developing on the bottom surface and forms a distortion known in the art as top surface batter.

This phenomenon of bottom surface distortion due to stannous tin pick up transferring through to the top surface of the glass was substantiated by taking two samples of float glass which had been prepared from the same ribbon of glass and heating and attenuating the samples at about the softening point of the glass. Attenuation at this temperature is believed to represent the attenuation that glass experiences on the forming and surfacing zone of the molten tin. Both samples of glass were heated and attenuated in an air atmosphere but one of the glass samples had its bottom or tin-contacting surface etched away with with hydrofluoric acid so that the etched surface showed no tin penetration by ultraviolet light fluorescence. The other sample of glass showed by electron microprobe analysis tin contents of approximately one percent by weight penetrated to about 20 microns into the surface of the glass, the percentage by weight being the average in the 20 microns of surface depth, with the tin concentration being greater nearer the surface. The results of the testing were that the unetched sample attenuated in air, developed a heavy bloom on the bottom surface and a bad top surface batter. The sample in which the tin-contacting surface had been chemically etched away developed no bloom or batter when heated and attenuated in air.

The significance of the experiments are that the bottom surface chemistry not only is the cause of bloom on the bottom surface but also surprisingly can be the cause of distortion on the top surface.

EMBODIMENT OF THE PRESENT INVENTION

To a commercial-size furnace capable of containing about 1600 tons of molten glass and which is used in conjunction with a molten tin bath for manufacture of flat glass by forming on the bath of molten tin are added on a continuous basis the following well-mixed batch ingredients:

| Ingredient | Parts by Weight |
|---|---|
| glass sand | 1000 |
| soda ash | 302 |
| limestone | 84 |
| dolomite | 242 |
| rouge | 0.95 |
| salt cake | 30 |
| carbon | 1.25 |
| cullet[1] | 660 |
| $CeO_2$ | 12 |

[1]The cullet has the following composition: 73.06 percent $SiO_2$, 13.64 percent $Na_2O$, 0.03 percent $K_2O$, 8.86 percent $CaO$, 3.86 percent $MgO$, 0.12 percent $Al_2O_3$, 0.30 percent $SO_3$, and 0.13 percent $Fe_2O_3$.

The glass batch is melted in the furnace at a temperature of about 2800°F. (crown temperature) in the melting zone. As the glass melts, it proceeds from the melting end of the tank through the fining zone where it is delivered through a narrow canal to the float forming chamber. The temperature of the molten glass entering the refiner from the melting portion of the furnace is about 2250° to about 2450°F. (glass surface temperature). The temperature of the molten glass near the entrance of the canal is about 2050° to about 2150°F. (glass surface temperature).

The forming chamber is of a construction illustrated in FIGS. 3 and 4 of the drawings and is divided into a forming and surfacing zone and a cooling zone. The overall length of the forming chamber is about 160 feet and the forming and surfacing zone constitute about the first two-thirds of the overall length and the cooling zone the remaining one-third. The molten tin in the beginning of the forming and surfacing zone is at a temperature of about 1900°F. and the temperature decreases in the direction of glass travel to about 1200°F. at the boundary with the cooling zone which is separated from the forming and surfacing zone by a drop arch and a graphite dam as shown in FIGS. 3 and 4. In the cooling zone, the molten tin ranges in temperature from about 1200°F. to 1100°F. in the direction of glass travel. Radiant heaters above the bath such as shown in FIGS. 3 and 4 are adjusted to maintain the recited temperature gradients.

Flat glass is produced in the above manner for a number of days and is continuously inspected in the manner described above. The glass is of excellent quality, being substantially free of top surface distortion.

I claim:

1. In a process of forming flat glass which comprises the steps of fusing a glass batch to form molten glass, delivering the molten glass to a pool of molten tin in a forming chamber, attenuating the molten glass along the surface of the tin while cooling to form a continuous sheet of flat glass having a desired, predetermined, final shape and thickness, advancing said sheet of glass along the pool of molten tin and eventually out of said forming chamber, said glass absorbing into its tin-contacting surface stannous tin which is capable of causing top surface distortion in the glass, the improvement comprising:

interfusing with said glass an oxidizing agent which is capable of oxidizing stannous tin to stannic tin in an environment of molten glass, said oxidizing agent being present in the glass in an amount sufficient to maintain said glass substantially free of top surface distortion but is present in an amount insufficient to impart heat-absorbing characteristics to the glass, said oxidizing agent being selected from the group consisting of the higher oxides of chromium, manganese, cerium, arsenic, and antimony.

2. The method of claim 1 in which the glass being formed is a soda-lime-silica glass.

3. The method of claim 1 in which the molten glass is delivered to the pool of molten tin and is freely spread over the surface of the tin to form a fluid pool of glass followed by attenuating said fluid pool of glass to form a continuous sheet of flat glass.

4. The process of claim 1 in which the molten glass is delivered to the pool of molten tin as a layer of molten glass.

5. The method of claim 4 in which the layer of molten glass is delivered to the pool of molten tin in a substantially horizontal manner from a region of molten glass which is at substantially the same elevation as that of the molten tin.

6. The process of claim 4 in which the layer of molten glass is delivered downwardly from a region of molten glass which is at a higher elevation than the molten tin.

7. The process of claim 1 in which the oxidizing agent is one which has a standard Gibbs Free Energy substantially more positive than $-125.5$ kilocalories per mole $O_2$ for the reaction:

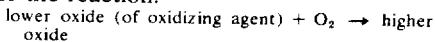
lower oxide (of oxidizing agent) + $O_2$ → higher oxide

8. The process of claim 1 in which the oxidizing agent is mixed with the glass batch ingredients before melting of the batch.

9. The process of claim 1 in which the oxidizing agent is present in the final glass composition in a concentration of 0.01 to 5 percent by weight based on total weight of the glass.

10. In a process of forming flat glass which comprises the steps of fusing glass batch to form molten glass, delivering the molten glass to a pool of molten tin in a forming chamber, attenuating the molten glass along the surface of the tin while cooling to form a continuous sheet of flat glass having a desired, predetermined, final shape and thickness, advancing said sheet along the molten tin and eventually out of said forming chamber, said glass, after it is initially delivered to the pool of molten tin, absorbing into its tin-contacting surface stannous tin which is capable of creating top surface distortion in the glass, the improvement comprising:

interfusing with said glass batch an oxidizing agent which is capable of and is present in an amount sufficient to oxidize stannous tin which has penetrated the bottom surface of the glass to stannic tin while the glass is being attenuated and has not attained its final shape and thickness, whereby the top surface of the glass is maintained relatively free of distortion, said oxidizing agent being present in the glass in an amount insufficient to impart heat-absorbing characteristics to the glass, said oxidizing agent being selected from the group consisting of the higher oxides of chromium, manganese, cerium, arsenic, and antimony.

11. The process of claim 1 wherein said oxidizing agent is selected from the group consisting of the higher oxides of manganese, cerium, and arsenic.

12. The process of claim 11 wherein said oxidizing agent is $CeO_2$.

13. The process of claim 10 wherein said oxidizing agent is selected from the group consisting of the higher oxides of manganese, cerium, and arsenic.

14. The process of claim 13 wherein said oxidizing agent is $CeO_2$.

* * * * *